United States Patent [19]
Talmi et al.

[11] 3,988,919
[45] Nov. 2, 1976

[54] USE OF GRAPHITIZED CARBON BEADS FOR GAS LIQUID CHROMATOGRAPHY

[75] Inventors: Yair Talmi; Charles B. Pollock, both of Oak Ridge, Tenn.

[73] Assignee: The United States of America as represented by the United States Energy Research and Development Administration, Washington, D.C.

[22] Filed: Oct. 7, 1975

[21] Appl. No.: 620,459

[52] U.S. Cl. .................................. 73/23.1; 55/67; 55/386
[51] Int. Cl.² .................................. G01N 31/08
[58] Field of Search ............ 73/23.1, 61.1 C; 55/67, 55/197, 386; 23/232 C, 254 R; 210/282

[56] References Cited
UNITED STATES PATENTS

| | | |
|---|---|---|
| 3,295,296 | 1/1967 | Halasz et al. ........................... 55/67 |
| 3,392,507 | 7/1968 | Ottenstein ............................... 55/67 |
| 3,407,573 | 10/1968 | Crowley ................................. 55/386 |
| 3,491,512 | 1/1970 | Timmins et al. ........................ 55/67 |
| 3,928,193 | 12/1975 | Melaja .................................... 55/386 |

OTHER PUBLICATIONS

Baumann et al., Porapak and Aeropak, pp. 1–9, Spring, 1966.

*Primary Examiner*—Richard C. Queisser
*Assistant Examiner*—Stephen A. Kreitman
*Attorney, Agent, or Firm*—Dean E. Carlson; David S. Zachry; John B. Hardaway

[57] ABSTRACT

Carbonized resin microspheroids are used as a column packing in gas-solid chromatography and as a support in gas-liquid chromatography.

5 Claims, 2 Drawing Figures

USE OF GRAPHITIZED CARBON BEADS FOR GAS LIQUID CHROMATOGRAPHY

This invention was made in the course of, or under, a contract with the Energy Research and Development Administration. It relates generally to the art of gas chromatography.

BACKGROUND OF THE INVENTION

The process known as gas chromatography is a powerful analytical tool as well as a valuable separation technique. The process is generally carried out by passing a mixture of gases through a packed column. Once inside the column the gases are sorbed by the packing, retained for a period of time, and then released. The period of time for which the various gases are sorbed on the packing is an inherent function of the interaction between the particular gas and the packing. Since different gases are retained by the packing for different lengths of time, a separation between the various gases is achieved by the time that the gases leave the end of a chromatographic column.

Frequently the column will be packed with only a solid. In this case the gases interact with the solid to achieve separation. This is referred to as gas-solid chromatography. In other instances a solid packing (support) is coated with a liquid (stationary phase) so that the gases interact with the liquid coating. This chromatographic technique is known as gas-liquid chromatography. Many column packing materials are available for use in either or both gas-liquid and gas-solid chromatography. As is readily apparent, the degree of successful separation achieved in any gas chromatographic process is highly dependent upon the type of column packing material.

Various packing materials have been routinely used in gas chromatography. The most prominent materials are polytetrafluoroethylene, diatomaceous earth, silica gel, molecular sieves, and high molecular weight polymers of chlorotrifluoroethylene. Carbon granules, graphitized carbon black, and graphite coated glass beads have also been used as column packing materials. Such packing materials have been used in gas-solid chromatography as well as with coatings in gas-liquid chromatography. Liquid coatings which have been generally used as the stationary phase in gas-liquid chromatography include low molecular weight polymers of chlorotrifluoroethylene and fluorocarbon oils such as the perfluoroalkanes.

The types and combinations of packing materials is thus large. However, even with a large variety of packing materials there are still gases that can't be effectively separated or resolved.

SUMMARY OF THE INVENTION

It is thus an object of this invention to provide a novel column packing material for use in gas chromatography.

It is a further object of this invention to provide a column packing material for use in gas chromatography which is generally spherical in shape.

It is a still further object of this invention to provide a carbon or graphite column packing material which is generally spherical or spheroidal in shape.

These as well as other objects are accomplished by the use of carbonized resin beads as a column packing material in gas chromatography.

DETAILED DESCRIPTION

Figure 1:
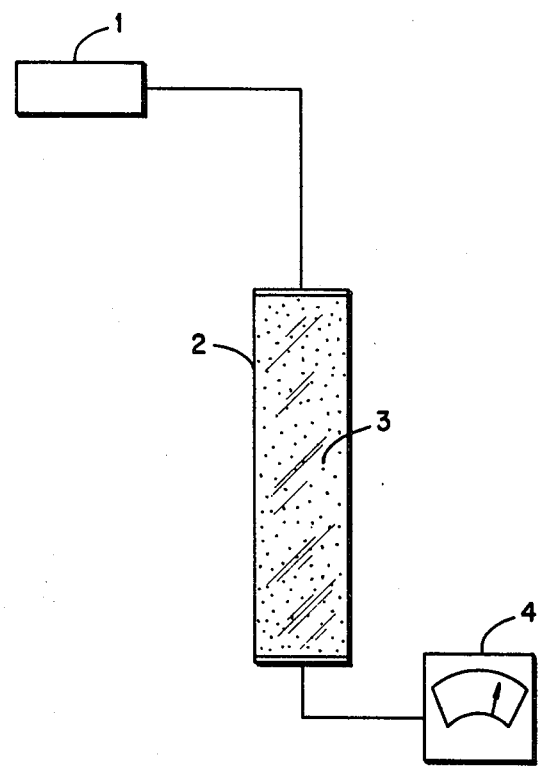
FIG. 1 schematically illustrates a gas chromatographic apparatus in accordance with this invention.

In accordance with this invention it has been found that carbonized or graphitized resin beads are highly useful as a packing material for use in gas chromatography. The carbonized resin beads used in accordance with this invention may be produced with a high degree of sphericity, e.g., a major to minor axis ratio of less than about 1.01. The high degree of sphericity is highly desirable in a chromatographic material because sorbed constituents travel substantially the same distance when being sorbed and released by the packing material. When coupled with uniformity of size, the high degree of sphericity means that similar sorbed constituents are released at substantially the same time. This phenomenon produces a greatly improved resolution of the gaseous constituents being separated.

The size of the carbon beads can be easily controlled by using conventional sieving operations. Size control may be carried out on the resin either before or after carbonization. The sizing operation, however, is preferably carried out prior to carbonization so as to avoid unnecessary handling and possible fracture of the carbonized beads. Particles having a diameter within the range of 100–600 micrometers are generally used in gas chromatography. To obtain uniform column packing the variation in particle diameter must be small. Size variations are considerably more controllable with the nearly perfect carbon spheres of this invention. The diameter of the particles is strongly related to the degree of resolution. The major contribution to poor resolution arises from the finite rate of the mass transfer in the mobile and stationary phases. The mass transfer rate is proportional to the mean-square diameter of the particles.

Carbonization of resin particles in accordance with this invention refers to the decomposition of a resin particle by the application of heat so as to leave substantially only elemental carbon as a relic of the precursor resin structure. Carbonization may take the form of a low temperature decomposition, e.g., 1500° C, process to leave an amorphous carbon relic. Carbonization, on the other hand, may take the form of a high temperature, e.g., 3000° C, decomposition process wherein a graphite relic is produced. The lower temperature carbonization process produces a more porous product which is more useful in gas-solid chromatography; whereas, the graphitized product is less porous and more useful as a solid support in gas-liquid chromatography. The surface area of the product spheres can vary from about 0.20 square meters per gram to about 165 square meters per gram. The type of resin and the heat-treatment temperature determine the amount and type of porosity and the ultimate surface area. The gel-type resins, those resins which have no true porosity in the uncarbonized state, have extremely small pores after carbonization (less than 0.3 micrometer) whereas the macroreticulated resins, those resins with large discrete pores, have larger and more open porosity at similar bulk densities after carbonization. A similar trend is apparent for BET surface areas. The gel beads have surface areas ranging from 0.4 m²/gm up to 16 m²/gm when carbonized in the temperature range 1000° to 2000° C. The reticulated beads have surface areas ranging up to 90 m²/gm after carbonization at 2000° C. Higher surface areas are obtainable with weak acid resins. Surface areas of up to 165 m²gm have been observed in styrene divinyl-benzene weak acid resins loaded with small amounts of uranium.

Virtually any thermosetting resin microsphere may be carbonized for use in this invention. However, resins of the ion exchange type are the preferred class because of the strength and sphericity of the resulting product. Styrene cross linked with divinyl benzene is the preferred resin within this class. Any of the other well known resins, however, are equally useful. Such resins include copolymers of methacrylic and acrylic acid cross linked with divinyl benzene as well as phenolic and epoxy matrix resins.

As is depicted in FIG. 1 of the drawing, an apparatus for carrying out a gas chromatography in accordance with this invention comprises means 1 for injecting a sample into column 2 packed with carbonized resin microspheroids 3 and a means 4 for detecting the flow of gases out of the column. Any conventional apparatus may be used with the column packing of this invention. Such conventional type of apparatus has as an injection means a sample introduction port wherein gases or liquid mixtures are introduced and/or vaporized into a glass or stainless steel column. The detecting means may be any of the conventionally used types such as the thermal conductivity, flame ionization, and electron capture types.

Having set forth a description of the gas chromatograhic method and apparatus in accordance with this invention, the following specific examples are given as a further illustration thereof.

EXAMPLE I

One pound of "Dowex-50" cation exchange resin (a sulfonated styrene divinyl-benzene gel-type bead, Dow Chemical Company) having 50–100 mesh size was tray dried for 16 hours at 110° C in air. The dried microspheres were carbonized to 1000° C in a fluidized bed furnace with helium serving as the fluidizing medium. Temperature was increased at a maximum rate of 200° C/hr. The resulting microspheres had a density of 1.4 gm/cc and a closed porosity of approximately 40%. The carbon was amorphous in nature in that X-ray diffraction studies indicated poorly crystallized material. The average pore size was less than 0.3 micrometer and the surface area of these batches was 0.2 to 0.6 m²/gm.

EXAMPLE II

The material produced in Example I was heat treated to a temperature of 1400° C under helium. The chemical and physical properties remained relatively constant but the surface area increased to 8 m²/gm. Additional heat treatment in the temperature range of 1400° to 2000° C yielded surface areas of 8 to 16 m²/gm.

EXAMPLE III

One pound of "Amberlite 200" (a macroreticulated sulfonated styrene divinyl-benzene resin from Rohm and Haas Company) was heated, as in Example I, to 1000° C. The resulting microsphere had a surface area of 25 m²/gm. Microsphere from this batch heated to temperatures ranging up to 2000° C yielded surface areas of up to 90 m²/gm.

EXAMPLE IV

Figure 2:
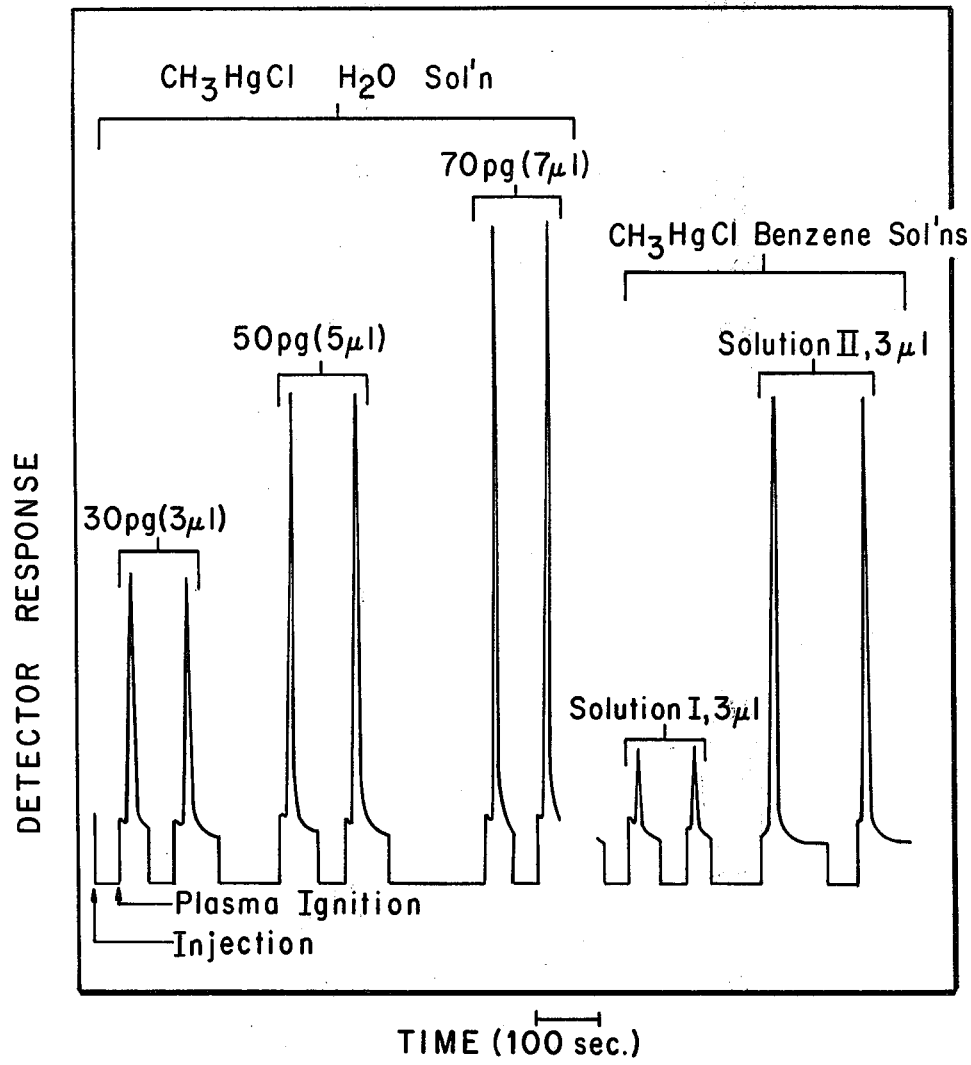
FIG. 2 is a chromatogram produced in accordance with this invention.

Resin-derived carbon beads 60/80 mesh produced from Dowex 50 (cation exchange resin) by carbonizing at 3000° C, coated with 1% FFAP (esterified polyethylene glycol having a molecular weight of about 20,000), were packed in a 3 ft. long, ¼ inch diameter, pyrex column. The column temperature was 135° C and the injector temperature was 200° C. Argon flow rate was 95 ml/min. Aliquots 1–5 μl of alkyl mercury aqueous solutions in the 0.01–10 μ/ml concentration range were injected into the GC column. The sharp and well resolved chromatograms of FIG. 2 were obtained where water was eluted after 5–8 seconds with no tailing effect. Conditions set forth in the following table were utilized.

TABLE

| Parameter | Determination of $Ch_3HgX$ in water and air |
|---|---|
| Column packing | 1% FFAP on 80/100 mesh carbon beads |
| Column length, ft. | 3 |
| Quartz Capillary, i.d., o.d. (mm) | 0.5, 6.5 |
| Carrier gas | argon |
| Carrier gas flow rate, cc/min | 95 |
| Pressure at the outlet of capillary, cm Hg | 75 |
| Column temp., ° C | 135 |
| Injector temp., ° C | 200 |

Common parameters for all experiments: microwave generator output, 30 W; monochromator slit width, 35μ; slit height, 12 mm; analytical spectral wave length, 253.7 nm; lens focal length, 4 in.; Photomultiplier voltage, 650 V.
Column dimensions: i.d. 3 mm, o.d. 6.5 mm.

The capacity of performing gas-chromatographic separations directly with aqueous mixtures is very desirable. There are very few solid supports which allow such separations and the results of this example are surprising in this regard.

It is thus seen that a new column packing material with highly desirable characteristics has been supplied by this invention, the scope of which is set forth in the following appended claims.

What is claimed is:

1. In an apparatus for carrying out gas chromatography comprising a packed column, means for feeding a mixture of gases into said column, and means for detecting the flow of gases out of said column; the improvement comprising carbonized resin microspheroids as the packing material within said column.

2. The improvement according to claim 1 wherein said carbonized resin beads have a specific surface area within the range of 0.20 to 165 square meters per gram.

3. The improvement according to claim 1 wherein the carbonized resin microspheroids have a diameter within the range of 100 to 600 micrometers.

4. The improvement according to claim 1 wherein the carbonized resin microspheroids are derived from a precursor resin selected from the group consisting of styrene divinyl-benzene, methacrylic acid, acrylic acid, phenolic and epoxy resins.

5. The improvement according to claim 1 further including a liquid coating on said carbonized resin microspheroids.

* * * * *